United States Patent [19]

Stipp

[11] Patent Number: 5,554,400
[45] Date of Patent: Sep. 10, 1996

[54] INFUSION BEVERAGE PRODUCT COMPRISING CO-AGGLOMERATED CREAMER AND SWEETENER SUITABLE FOR BAG AND FILTER PACK BREWING

[75] Inventor: Gordon K. Stipp, Cincinnati, Ohio

[73] Assignee: The Procter & Gamble Company, Cincinnati, Ohio

[21] Appl. No.: 435,054

[22] Filed: May 8, 1995

Related U.S. Application Data

[63] Continuation of Ser. No. 295,587, Aug. 25, 1994, abandoned.

[51] Int. Cl.$^6$ .............................. B65B 29/02; A23F 5/24; A23F 3/18
[52] U.S. Cl. .......................... 426/78; 426/285; 426/595; 426/433; 426/435
[58] Field of Search .............................. 426/77–84, 285, 426/594, 595, 433, 435

[56] References Cited

U.S. PATENT DOCUMENTS

| | | | |
|---|---|---|---|
| 2,330,884 | 10/1943 | Harriman . | |
| 2,832,686 | 4/1958 | Louder et al. . | |
| 2,850,388 | 9/1958 | Peebles et al. . | |
| 2,977,203 | 3/1961 | Sienkiewicz | 23/313 |
| 3,080,235 | 3/1963 | Hodson et al. . | |
| 3,126,284 | 3/1964 | Howerin . | |
| 3,227,558 | 1/1966 | Richmond . | |
| 3,257,212 | 6/1966 | Kasket . | |
| 3,300,315 | 1/1967 | Nava et al. . | |
| 3,458,319 | 7/1969 | Block et al. . | |
| 3,493,388 | 2/1970 | Hair . | |
| 3,560,218 | 2/1971 | Whelan . | |
| 3,615,669 | 10/1971 | Hair et al. . | |
| 3,652,293 | 3/1972 | Lombana et al. . | |
| 3,653,911 | 4/1972 | Mancuso et al. . | |
| 3,706,572 | 12/1972 | Einstman et al. . | |
| 3,713,842 | 1/1973 | Lubsen et al. . | |
| 3,869,555 | 3/1975 | Heonis | 426/134 |
| 3,879,565 | 4/1975 | Einstman et al. | 426/302 |
| 3,892,867 | 7/1975 | Schoonman | 426/93 |
| 4,001,448 | 1/1977 | Finucane et al. | 426/285 |
| 4,022,916 | 5/1977 | La Tour | 426/285 |
| 4,025,659 | 5/1977 | Cho et al. | 426/613 |
| 4,076,847 | 2/1978 | Johnson et al. | 426/78 |
| 4,081,560 | 3/1978 | Ishigaki | 426/115 |
| 4,318,932 | 3/1982 | Ewing et al. | 426/285 |
| 4,338,338 | 7/1982 | Popkes | 426/82 |
| 4,338,349 | 7/1982 | Franklin et al. | 426/631 |
| 4,438,147 | 3/1984 | Hedrick, Jr. | 426/570 |
| 4,497,835 | 2/1985 | Winston | 426/72 |
| 4,554,167 | 11/1985 | Sorge et al. | 426/285 |
| 4,594,256 | 6/1986 | Zemelman et al. | 426/594 |
| 4,594,257 | 6/1986 | Leblanc et al. | 426/594 |
| 4,619,833 | 10/1986 | Anderson | 426/548 |
| 4,640,839 | 2/1987 | Hsu | 426/285 |
| 4,735,810 | 4/1988 | Dacal | 426/80 |
| 4,826,695 | 5/1989 | Tanner | 426/77 |
| 4,828,850 | 5/1989 | Davis | 426/77 |
| 4,891,232 | 1/1990 | Dahl | 426/78 |
| 4,913,916 | 4/1990 | Tanner | 426/80 |
| 4,975,292 | 12/1990 | Loizzi | 426/77 |
| 4,980,181 | 12/1990 | Camp et al. | 426/98 |
| 5,043,172 | 8/1991 | Loizzi | 426/77 |
| 5,047,252 | 9/1991 | Liu et al. | 426/79 |
| 5,051,269 | 9/1991 | Noreille et al. | 426/453 |
| 5,264,228 | 11/1993 | Pray et al. | 426/285 |
| 5,284,674 | 2/1994 | Fazio | 426/580 |
| 5,433,962 | 7/1995 | Stipp | 426/96 |

FOREIGN PATENT DOCUMENTS

| | | |
|---|---|---|
| 75953/91 | 11/1991 | Australia . |
| 903148 | 6/1972 | Canada . |
| 959336 | 12/1974 | Canada . |
| 0052919 | 6/1982 | European Pat. Off. . |
| 109454 | 5/1984 | European Pat. Off. . |
| 0458310 | 11/1991 | European Pat. Off. . |
| 0574152A1 | 12/1993 | European Pat. Off. . |
| 556408 | 7/1923 | France . |
| 649630 | 8/1937 | Germany . |
| 237897 | 9/1943 | Germany . |
| 8203-277 | 4/1983 | Germany . |
| 247836 | 7/1987 | Germany . |
| 58-149642 | 9/1983 | Japan . |
| 59-028458 | 2/1984 | Japan . |
| 60-20971 | 5/1985 | Japan . |
| 93-03815 | 5/1993 | Japan . |
| 13690 | of 1910 | United Kingdom . |
| 1301770 | 1/1973 | United Kingdom . |
| 2247001 | 2/1992 | United Kingdom . |

OTHER PUBLICATIONS

Harper, W. J.; "Synthetic and Imitation Dairy Products"; Synthetic and Imitation Dairy Products; vol. 22; pp. 465–498 No Date.

Pintauro, N. D.; "Falling Curtain Process" Agglomeration Techniques, Coffee Solubilization—Commercial Processes and Techniques; Noyes Data Corp.; 1975; pp. 177–209.

*Primary Examiner*—Steven Weinstein
*Attorney, Agent, or Firm*—Brahm J. Corstanje; Eric W. Guttag; Rose Ann Dabek

[57] ABSTRACT

The present invention relates to an infusion product for making a beverage comprising an infusible material and a soluble additive material packaged in an infusion bag, wherein the soluble additive material comprises a co-agglomerate of a creamer base and a sweetener base. The present invention also relates to a process for making an infusion product comprising packaging an infusion material and a co-agglomerate of a creamer base and a sweetener base in an infusion bag. The present invention further relates to a method of preparing an individual serving of a beverage such as coffee, tea or the like, comprising immersing in a receptacle of hot water such an infusion product.

17 Claims, No Drawings

INFUSION BEVERAGE PRODUCT COMPRISING CO-AGGLOMERATED CREAMER AND SWEETENER SUITABLE FOR BAG AND FILTER PACK BREWING

This is a continuation of application Ser. No. 08/295,587, filed on Aug. 25, 1994, now abandoned.

FIELD

The present invention relates to a composition and method for producing a beverage from an infusible material such as coffee or tea. More particularly, the invention relates to the production of a predetermined number of servings of beverage infusions using a composition or method which provides a soluble creamer and sweetener capable of readily passing through a porous bag containing the composition, following the addition of water.

BACKGROUND

A quick cup of coffee may be produced now-a-day by putting conventional instant, freeze dried coffee in a cup of hot water. This coffee typically comprises ground up crystals derived from a brew of the coffee; a spoonful of the crystals then being dissolved in the cup of hot water so as to form the beverage. However, persons who are fond of drinking coffee are aware that such instant coffee is generally not as tasty as slowly brewed coffee that is made directly from the coffee beans.

Additionally, some drinkers of slow brewed coffee prefer to add sweetener and cream to their coffee beverage. For such drinkers, there has been a desire to avoid the necessity of separately adding sugar and creamer to one's coffee beverage. For example, such persons would desire the convenience of a single serve infusion bag containing roasted ground coffee, sweetener and sugar. Such a bag would be placed in a cup of hot water for a time sufficient to allow the coffee to brew. Unfortunately, previous attempts at products containing a mixture of coffee, creamer and sugar particles within a porous bag have provided inferior beverages. Typically, the fat in the creamer, being a hydrophobic substance, will go into solution much less readily. The fat subsequently builds up and forms a film on the inside of the porous bag. This film tends to obstruct the pores in the bag, thereby retarding or preventing further flow of any remaining coffee, sugar and creamer to outside the bag. The consequence is incomplete extraction of coffee from the bag, resulting in a highly variable and generally weak flavored beverage.

Based on the foregoing, there is a need for an infusion bag-type product useful for preparing an infusion beverage such as coffee, tea or the like, wherein the product comprises a creamer and a sweetener, yet the creamer does not hinder the flow of sweetener, creamer and extracted coffee/tea through the pores of the infusion bag.

It is an object of the present invention to provide an infusion product comprising a porous beverage packet of simple, inexpensive, unitary and compact character suitable for use in the preparation of a palatable beverage such as coffee, tea or the like wherein the subsequent addition of creamer and sweetener is unnecessary.

It is also an object of the present invention to provide such an infusion product comprising a porous beverage packet which contains creamer, sweetener and an infusible material such as coffee or tea, wherein the fat contained in the creamer does not obstruct the pores of the packet, thereby avoiding hindrance of the flow of sweetener, creamer and extracted coffee/tea through the pores of the packet.

It is also an object of the present invention to provide a method for making such a beverage packet.

It is also an object of the present invention to provide a method for preparing a serving of a beverage such as coffee, tea or the like using such a beverage packet.

These and other objects of the present invention will become evident to those skilled in the art from a reading of the present disclosure with the appended claims.

SUMMARY

The present invention relates to an infusion product for making a beverage comprising an infusible material and a soluble additive material packaged in an infusion bag, wherein the soluble additive material comprises a co-agglomerate of a creamer base and a sweetener base.

The present invention also relates to a process for making an infusion product comprising packaging an infusible material and a co-agglomerate of a creamer base and a sweetener base in an infusion bag.

The present invention further relates to a method of preparing an individual serving of a beverage such as coffee, tea or the like, comprising immersing in a receptacle of hot water such an infusion product.

The present invention additionally relates to a beverage prepared by immersing in hot water such an infusion product.

DETAILED DESCRIPTION

The present invention is directed to a an infusion product for making a beverage comprising an infusible material (such as coffee, tea or the like) and a soluble additive material packaged in an infusion bag, wherein the soluble additive material comprises a co-agglomerate of a creamer base and a sweetener base. Such a product satisfies the need for a simple porous bag-type product for preparing a beverage such as coffee, tea or the like, wherein the product comprises a creamer and sweetener, yet the creamer does not hinder the flow of the sweetener, creamer and extracted coffee/tea through the pores of the infusion bag.

The following is a list of definitions for terms used herein.

"Bulk density" refers to the overall density of a plurality of particles measured in a manner described on pp. 130–131 of COFFEE PROCESSING TECHNOLOGY, Avi Publishing Company, Westport, Conn., 1963, Vol. II.

"Comprising" means that other steps and other ingredients which do not affect the end result can be added. This term encompasses the terms "consisting of" and "consisting essentially of".

"Mesh" refers to the number of apertures per square inch of a screen or sieve; i.e., it is the square of the number of strands of metal or plastic per linear inch. All references to mesh size herein refer to U.S. Standard Sieve Series.

"µ" means microns.

"psig" means pounds per square inch gauge.

All percentages are by weight of total composition unless specifically stated otherwise.

All ratios are weight ratios unless specifically stated otherwise.

The present invention relates to an infusion product for making a beverage comprising an infusible material and a soluble additive material packaged in an infusion bag, wherein the soluble additive material comprises a co-agglomerate of a creamer base and a sweetener base.

The present invention also relates to a process for making an infusion product comprising packaging an infusible material and a co-agglomerate of a creamer base and a sweetener base in an infusion bag.

The present invention further relates to a method of preparing an individual serving of a beverage such as coffee, tea or the like, comprising immersing in a receptacle of hot water such an infusion product.

The present invention additionally relates to a beverage prepared by immersing in a receptacle of hot water such an infusion product.

The invention will be predominantly described with reference to a composition and method for brewing an individual cup of coffee. However, it is to be understood that the infusion product and methods of this invention are not limited to the preparation of a coffee beverage, but is applicable to the infusion of other beverages of infusible material, such as, for example, tea, herbal tea, herbal medicines, cold water soluble tea, cocoa, chicory, grain-based coffee substitutes and the like.

Infusible Material

"Infusible material" refers to a material which is typically steeped, soaked or percolated in an aqueous solution (preferably water) in order to extract edible soluble elements therefrom. Examples of such infusion material include, but are not limited to, coffee, tea, herbs, cocoa and the like. The infusible material is preferably tea or coffee, more preferably coffee.

a. Coffee

The term "coffee" as used herein is used in its broadest sense, and it includes coffee particles which have been ground, decaffeinated, compressed, changed in appearance and physical form, and coffee particles in which flavor additives are used in admixture with the coffee. Occasionally, the term is used in a sense identifying the brewed beverage, as will be clearly understood in the context of the description.

The roasted and ground coffee material used in this invention may be any single variety of coffee, but is usually a blend of different varieties. The blend may be formulated either before or after roasting and/or grinding. The coffee may be decaffeinated or undecaffeinated. The coffee may also be processed to reflect a unique flavor characteristics such as expresso, French roast, or the like.

It is preferable to remove, from the roasted and ground coffee, fine particles having a size of less than about 40 U.S. mesh (about 420μ) in order to reduce both dust escaping from the bag during handling and insoluble sediment occurring in the cup of brewed beverage. Removal of this fine material may be done by conventional screening techniques.

However, in some cases it has been found that it may be desirable to permit some sediment to occur within the brewed beverage in order to satisfy the preference of some consumers who are accustomed to observing sediment in fresh brewed coffee beverages. Amounts of sediment up to about 300 mg per 6 oz of coffee beverage have been found to be acceptable, with amounts of about 100 to 200 mgs per 6 oz being a preferred level in this instance. The level of cup sediment may be adjusted by varying the porosity of the infusion bag material and/or the screening level for the roasted and ground coffee.

Soluble Additive Material a. Co-agglomerated Creamer/Sweetener Base

In addition to the infusible material, the infusion product further comprises soluble additive material. The soluble additive material comprises a creamer base and a sweetener base which are co-agglomerated to one another.

"Creamer base" refers to a creamer or creamers useful in the infusion product of the present invention. Such creamers include, but are not limited to, non-dairy creamers, synthetic and imitation dairy products, non-fat and whole milk solids. Preferred creamers include, non-dairy creamers made from vegetable fats, sugar, emulsifier, carbohydrates, sodium caseinate, and buffers. The creamer base may further include thickening agents such as modified food starches and/or natural and synthetic gums such as xanthan, cellulose gel (Avicel™), carrageenan and sodium carboxymethylcellulose. Additional creamers suitable for use in the infusion product and processes of the present invention include those synthetic and imitation dairy products disclosed in KIRK OTHMER ENCYCLOPEDIA OF CHEMICAL TECHNOLOGY, W. J. Harper, Willey Interscience, 3rd edition, Vol. 22, section entitled "Synthetic and Imitation Dairy Products", pp. 465–498, (1978). Preferably, the infusion product of the present invention comprises from about 25% to about 55%, by weight of creamer; more preferably from about 30% to about 50%; more preferably still, from about 35% to about 45%.

"Sweetener base" refers to a sweetener or sweeteners useful for sweetening a beverage made by the infusion product of the present invention. Such sweeteners include natural and artificial sweeteners. Such natural sweeteners useful in the infusion product and processes of the present invention include, but are not limited to, sucrose, fructose, dextrose, maltose, lactose, or mixtures thereof. Such artificial sweeteners include, but are not limited to saccharin, cyclamates, acetosulfam K (Sunette™), L-aspartyl-L-phenylalanine lower alkyl ester sweeteners (e.g. Aspartame™); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethylalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986.; and the like and mixtures thereof. Preferably the artificial sweeteners are combined with a bulking agent. Examples of such bulking agents include, but are not limited to, maltodextrins and polydextrose. Preferably, the infusion product of the present invention comprises from about 25% to about 75%, by weight of sweetener; more preferably from about 40% to about 60%; more preferably still, from about 45% to about 55%. Such ranges are directly applicable to natural sweeteners. With regard to artificial sweeteners, such ranges refer to the % of an artificial sweetener and bulking agent mix, having a similar sweetness level to natural sweeteners. More preferably, the infusion product comprises from about 0.1% to about 3% of an artificial sweetener and from about 22% to about 72% of an artificial sweetener bulking agent; more preferably from about 0.1% to about 2% of an artificial sweetener and from about 38% to about 60% of an artificial sweetener bulking agent; more preferably still from about 0.1% to about 1% of an artificial sweetener and from about 44% to about 55% of an artificial sweetener bulking agent.

b. Other soluble additive materials

In one embodiment of the present invention, the infusion product further comprises a thickening agent. Known or conventional thickening agents can be used. The thickening agent enhances the milk-like texture characteristics provided by the creamer component. The thickening agent also helps prevent sedimentation of the reconstituted soluble additive materials, particularly when cocoa solids are used in the formulation. Preferably the infusion product comprises from about 0.02% to about 3%, preferably from about 0.3% to about 2.5%, by weight of a thickening agent. Preferably the thickening agent is co-agglomerated to the creamer base and sweetener base.

Any food grade thickening agent can be used in the dry beverage mix, provided that it is compatible with the other essential ingredients therein. Suitable thickening agents include, but are not limited to, cellulose gel (Avicel™), carrageenan, guar, pectin, sodium carboxymethylcellulose (CMC), xanthan, and various food starches (modified and unmodified). Selection of the thickening agent will be determined primarily by mouthfeel characteristics, cost and efficiency in producing the desired thickening enhancing characteristics. CMC is preferred from a mouthfeel and flavor display standpoint. It has been further surprisingly discovered that co-agglomeration of the thickening agents with the creamer and sweetener bases enhances the rate of solubility and improves the cup appearance of the beverage.

Additional soluble additive materials may be included in the infusion product. For example, a wide variety of flavorings may be added. Such flavorings include, but are not limited to, any one of the commercially available flavorings. Preferably, such flavorings are sourced from encapsulated or liquid flavorings. The flavorings may be natural or artificial in origin. Preferred flavorings include, but are not limited to, Almond Nut, Amaraetto, Anisette, Brandy, Cappuccino, Chocolate, Chocolate Mint, Cinnamon, Cinnamon Almond, Creme de Menthe, Grand Mariner, Irish Creme, Kahlua, Macadamia Nut, Orange, Orange Leaf, Peppermint Stick, Pistachio, Raspberry, Sambuca, and Vanilla bean. Actual levels of flavoring added will depend upon the strength of flavor desired. Such levels are readily determined by one skilled in the art. Preferably, the infusion product comprises from about 0.1% to about 10%, by weight of flavoring(s); more preferably from about 0.1% to about 5%; more preferably still, from about 0.1% to about 3%. Such flavorings may be included in the infusion product in encapsulated or liquid form.

Other soluble additive materials include soluble ("instant") coffee or tea, as well as cocoa.

Agglomeration

"Agglomeration" refers to the preparation of relatively larger particles by combining a number of relatively smaller particles into a single unit. Many specialized processes and types of processing equipment have been developed for the agglomeration of particulate solids. (See generally, Pintaufo, N. D., COFFEE SOLUBILIZATION COMMERCIAL PROCESSES AND TECHNIQUES, Noyes Data Corporation, "Agglomeration Techniques", pp. 177–209, (1975)). However, the same basic operating principles are involved in practically all cases. An agglomerating fluid, e.g., oil, liquid water or steam, is uniformly distributed throughout the particles to be agglomerated, causing part or all of the particles to become tacky. The particles are then agitated, allowing the tacky particles to contact and adhere to other particles. Proper control of the amount of agglomerating fluid and the type and time of agitation will provide control over the final size of the agglomerated product.

Applicant, however, has discovered that steam agglomeration produces a surprisingly superior creamer/sweetener base co-agglomerate, as compared to creamer/sweetener base co-agglomerates produced by alternative methods of agglomeration. For example, agglomeration methods which use water typically result in a high density product which does not quickly dissolve.

A typical steam agglomeration procedure useful for purposes of the present invention involves the following general steps. A plane of discretely arranged creamer base and sweetener base particles are caused to move in a first direction preferably in the form of a falling curtain. These moving particles are contacted by a jet of steam, thereby redirecting the particles. As the particles in the curtain enter the path of the jet of steam, they immediately become wetted. By being directed in the path of the jet of steam, they are caused to contact one another, and subsequently agglomerate. (See, for example, U.S. Pat. No. 3,652,293, Lombana, Phillips and Gregg, Issued Mar. 28, 1972; U.S. Pat. No. 4,640,839, Hsu, issued Feb. 3, 1987; and U.S. Pat. No. 2,977,203, Sienkiewicz, Kohler and Schulman, issued Mar. 28, 1961).

The following is a general description of a preferred process for co-agglomerating the creamer base and sweetener base useful in the infusion product.

Preferably the creamer base has a particle size of about 6–26% on 60 mesh, about 20–40% on 100 mesh and about 34–54% on 170 mesh; more preferably about 16% on 60 mesh, about 30% on 100 mesh and about 44% on 170 mesh.

Preferably, when the sweetener base is a natural sweetener, the sweetener base has a particle size of about 0–54% on 45 mesh, about 1–27% on 60 mesh, about 10–70% on 100 mesh and about 3–43% on 170 mesh; more preferably about 2% on 60 mesh, about 60% on 100 mesh and about 33% on 170 mesh.

The creamer base and sweetener base particles are blended in a ratio of from about 25:75 to about 75:25, more preferably from about 40:60 to about 60:40, more preferably still about 50:50. Blending may be conducted by ribbon blender, V blender, or the like.

The blended creamer base and sweetener base particles are subsequently co-agglomerated as follows. In a preferred embodiment, the blended particles are contacted with steam in a free-fall condition. The free-falling particles may be in a single curtain pattern or multiple curtain patterns. The steam of agglomeration may be either saturated or superheated. Additionally, air may be injected with the steam to facilitate displacement of the co-agglomerates from the steam contact zone. Preferably, the steam is applied such that about 1–4% moisture is added to the base particles. Preferably the particle surfaces are heated above the glass transition point to become tacky. This is achieved by varying the velocity and pressure of the steam. Furthermore, the steam velocity and pressure should be such that it is insufficient to cause damage to the creamer flavor. Suitable steam velocities are from about 200 to about 2,000 ft/sec, more preferably from about 250 to about 1,500 ft/sec, more preferably still from about 300 to about 1,000 ft/sec. Suitable steam pressures are from about 5 to about 75 psi, more preferably from about 10 to about 50 psi, more preferably still from about 15 to about 35 psi. The steam to creamer and sweetener base blend ratio will vary from about 0.01:1 to about 1:1, more preferably from about 0.01:1 to about 0.5:1, more preferably still from about 0.01:1 to about 0.1:1. Preferably, the application of steam results in sufficient moisture addition to cause the particles to have a resulting moisture content of from about 1% to about 4%, more preferably from about 2% to about 3%.

The hot moist product is subsequently allowed to solidify below the glass transition point. This is preferably accomplished by residence time on a moving belt or cooling air moving across the co-agglomerate. During this treatment, the carbohydrates crystallize from an amorphous form. Typically at least about 60 to about 120 seconds at ambient temperature is necessary to accomplish this phase change. This step is referred to as "setting".

The creamer/sweetener base co-agglomerates are subsequently dried to minimize flavor deterioration and caking. Preferably such drying occurs in an atmosphere which minimizes possible agglomerate-to-agglomerate agglomeration. Such drying is suitably practiced in the lower section of a tower while the co-agglomerates are still in free-fall. A dryer air temperature (inlet) above about 140° F. (about 60° C.) and below about 190° F. (about 88° C.) is preferred, more preferably above about 150° F. (about 66° C.) and below about 180° F. (about 82° C.). Alternatively, the co-agglomerated creamer and sugar base may be dried on a vibratory dryer (e.g., Jeffrey) or fluidized bed dryer using similar conditions.

Preferably, this material is cooled to ambient temperature upon its discharge from the dryer. Preferably, the creamer/sweetener base co-agglomerates are dried to less than about 2.5% moisture content, more preferably less than about 2.0%. This is achieved by adjusting the air flow, air temperature and residence time within the dryer.

After drying, the co-agglomerates may be screened to remove undersized and oversized particles and/or to modify density.

For those embodiments of the infusion product comprising a thickening agent co-agglomerated to the creamer base and the sweetener base, the above-agglomeration procedure can be readily adapted for forming such thickener/creamer/sweetener co-agglomerates.

In one embodiment of the invention, the creamer/sweetener base co-agglomerates (or thickener/creamer/sweetener co-agglomerates) are subsequently coated with additional soluble additive materials such as instant coffee, cocoa or flavorings. Such coating is achieved by mixing the co-agglomerates with the additional material. The porosity of the agglomerates facilitates the coating step by providing voids within the co-agglomerate for deposition of the additional material particles. This may be accomplished using a gentle mixing system such as a V blender.

The finished co-agglomerate has a preferred particle size distribution of about 6–13% on 12 mesh, 39–67% on 30 mesh, 9–21% on 45 mesh, 2–15% on 60 mesh, and 2–13% on 100 mesh.

The finished co-agglomerate has a preferred bulk density of from about 0.3 gm/cc to about 0.7 gm/cc, more preferably from about 0.4 gm/cc to about 0.6 gm/cc, more preferably still about 0.5 gm/cc.

For those embodiments of the infusion product comprising a thickening agent co-agglomerated to the creamer base and the sweetener base, the above-agglomeration procedure can be readily adapted for forming such thickener/creamer/sweetener co-agglomerates.

Infusion Bag

The preparation of the beverages of the present invention is obtained by the infusion of the infusible material in a soluble base, preferably water. An infusion bag filled with infusible material and soluble additive material is immersed or contacted with hot water. The hot water extracts soluble edible materials from the infusible material and the extracted material, along with the soluble additive material, dissolves in the water and flows outside the bag.

The infusion bag is porous, and may be formed of polymeric or paper-like material generally including the characteristic of a mesh size somewhat smaller than the included infusible material and soluble additive material therein.

The fabric must act as a filtering means to accomplish the objectives of preventing the formation of sediment in the brewed beverage. The fabric thickness used can vary, but preferably is from about 0.002 in. to about 0.12 in., more preferably from about 0.003 in. to about 0.009 in.

The size of the pores of the fabric of the infusion bag of the present invention can vary from about 5 µ to about 1000 µ, preferably from about 20 µ to about 200 µ. If a substantial portion of the pores are smaller than approximately 5 µ, it may be impossible, regardless of time, to extract all of the desired flavor components and constituents from the infusible material in the bag and into the brewed beverage since smaller pore sizes tend to clog during brewing. Pore openings larger than about 1000 µ are generally to be avoided since they permit passage of coffee fines into the beverage resulting in a high level of sediment. In addition, pore sizes larger than about 1000 µ will allow the smaller particles to sift out in agitation, as for example on shipping, and a dusty coffee packet having an undesirable appearance can result. (However, note, as discussed above, that some consumers may prefer a slight coffee sediment in the final beverage).

The infusion bag may be of any desired character as, for example, a sheet folded over and attached along the three overlying contiguous edges. Infusion bags of the type normally associated with the term "tea bags" are useful in the present invention. In addition to infusion bags designed for steeping, infusion bags useful in the present invention include those designed for the percolation method of preparation, vacuum pot preparation and drip method of preparation. All that is necessary to adapt the infusion bag to alternative methods of preparation is that the bag be of a shape and design compatible with the brewing method. One skilled in the art can design such infusion bags within the spirit and scope of this invention. Examples of infusion bags useful in the present invention include, but are not limited to, those disclosed in U.S. Pat. No. 5,047,252, Liu, Oren, Rushmore and Wetherilt, issued Sep. 10, 1991; U.S. Pat. No. 4,826,695, Tanner, issued May 2, 1989; U.S. Pat. No. 4,735,810, Dacal, issued Apr. 5, 1988; U.S. Pat. No. 3,607,302, Beck; U.S. Pat. No. 3,384,492, Spencer; U.S. Pat. No. 3,373,677, Petrozzo; U.S. Pat. No. 2,791,505, Barnett; U.S. Pat. No. 3,183,096, Hiscock; U.S. Pat. No. 3,175,911, Rambold; U.S. Pat. No. 2,571,138, Irmischer; U.S. Pat. No. 2,531,594, Abrahams; U.S. Pat. No. 2,593,608; Canadian Patent 959,336, Jones, Orozovich and Spotholz, issued Dec. 17, 1974; and Canadian Patent 903,148, Coward, issued Jun. 20, 1972. Other infusion bags useful in the present invention include those offered by Yamanaka Ind. Co., Ltd, Kyoto, Japan; Bolloré Technologies, Dayville, Conn., USA; and J. R. Crompton Ltd, Marietta, Ga., USA. The bag material is preferably comprised of a thin, porous filter paper. Conventional tea bag material is satisfactory for use in this invention. When employing a coffee-based product of the present invention, it is possible to use material which has a porosity somewhat greater than conventional tea bag material. However, care should be taken to prevent excessive amounts of insoluble coffee material from passing through the bag material. Screening and/or pelletizing the roasted and ground coffee may be employed to reduce the amount of fine coffee material present within the infusion bag.

Infusion bags of varying sizes can be used in the present invention such that one or more cups of beverage may be produced from a single bag. In one embodiment, the infusion product comprises a single serving brewing bag.

The infusion bag contains a measured quantity of infusible material sufficient for preparing a predetermined number of cups (preferably one) of infusible beverage. The amount of infusible material contained in the bag is dependent on the number of cups of beverage that the bag is designed to brew.

In one embodiment, the infusible material is particulate coffee. The nature of the particulate coffee used is not critical. Preferably roasted coffee in finely divided and/or flaked form is used. Preferably the amount of coffee used per single serving is about 5 to about 12 gm, wherein the coffee has a tamped density of about 0.28 to about 0.34 gm/cc; more preferably from about 6 to about 9 gm. Preferably about 3 to about 6 gm are used wherein the coffee has a bulk density of about 0.465 gm/cc. It is to be understood that the number of cups to be brewed from each bag is not a critical consideration but merely a matter of convenience and marketing strategy. A consumer product embodying the principal of this invention can be designed for brewing one cup (e.g., particularly for steeping in a cup) or several cups (e.g., particularly for use in a percolator or drip type pot) at one time. In addition, the amount of infusible material and soluble additive material per cup can be varied such that a stronger or milder beverage can be brewed. If desired, a minor amount (e.g., typically 1 gm or less) of soluble coffee powder may also be included in the bag, in which event the amount of roasted coffee particles used may be reduced accordingly to prepare a cup of coffee having a desired strength. Single serving bags are preferably dimensioned to readily fit within a conventional coffee cup or mug and be readily submerged upon the addition of water.

The bag must be sized to permit movement of the infusion material and soluble additive material particles therein. That is, the material particles must not be so tightly packed in the bag as to restrict free contact between the water and the particles throughout the bag in the preparation of a beverage.

It is also within the scope of this invention to include additional materials within the infusion bag such as spray dried, agglomerated, or freeze dried soluble coffee solids, and various flavor and aroma enhancers.

Use

In one embodiment, the infusion product is inserted in a suitable vessel, such as a conventional beverage cup or mug, filled with hot water so that the infusion bag is submerged in the water. Alternatively, the cup or mug may be first filled with hot water, and the infusion product subsequently placed in the cup. The infusible material is infused in water, and the soluble additive material and soluble materials extracted from the infusible material are dissolved and flow out of the bag, preferably by repeated dunking of the bag in the water. Upon the infusion of a desirable concentration of infusion material, the bag is removed from the cup and discarded. The result is a beverage of good aroma comprising a desired amount of sweetener and cream, wherein the separate addition (e.g., after infusion of the infusion material) of sweetener and cream has been obviated.

Alternatively, a coffee beverage is prepared by placing the infusion product in a percolator or automatic drip-type coffee maker, or the like, and contacting the infusion product with hot water.

The previously described embodiments of the present invention have many surprising advantages, including the ability to prevent the creamer base from obstructing the pores of the infusion bag, thereby preventing complete flow of creamer, sweetener and solubles extracted from the infusible material to flow out of the bag and properly flavor the beverage. Without being bound by theory, it is believed that the fat contained in the creamer base, being a hydrophobic substance, is slow to dissolve. As a result, it is believed that the fat collects on the inner surface of the infusion bag, forming a film. This film effectively retards and/or prevents the further flow of other soluble materials from the interior of the infusion bag to the beverage (exterior of the infusion bag). It is further believed that by co-agglomerating the creamer particles to the sweetener particles (which are hydrophilic), the creamer particles are readily "pulled in" by the sweetener as it quickly dissolves in the solution.

An additional advantage is less variation in the composition of the co-agglomerated material. The co-agglomeration also bestows improved flowability and handling characteristics to the creamer and sweetener materials. This is particularly important during bag refilling operations.

The following examples further describe and demonstrate the preferred embodiments within the scope of the present invention. The examples are given solely for the purpose of illustration, and are not to be construed as limitations of the present invention since many variations thereof are possible without departing from its spirit and scope.

EXAMPLE 1

The extractability of non-dairy creamer and sugar solids from an infusion product of the present invention is compared to the extraction of the same ingredients in a non-agglomerated product.

Commercial grade non-dairy creamer (35% fat content) and fine grade sugar is blended in a ribbon blender for 5 min. to produce a 51% creamer and 49% sugar mixture. The resultant mixture is agglomerated with steam using the apparatus described in U.S. Pat. No. 3,652,293, Lombana, Phillips and Gregg, issued Mar. 28, 1972. The creamer and sugar mixture is wetted with steam at 26 psig using a chute gap of 1⅝ in. The velocity of the jet of steam is about 500 ft./min. at the point where the jet of steam is introduced to the falling stream of creamer and sugar. The creamer and sugar co-agglomerates are discharged onto a moving belt which provides about 70 sec. residence time prior to drying. Shorter residence times result in a sticky agglomerate which will not dry properly. The agglomerates are dried in a Jeffrey dryer at 150°–190° F. (about 66°–88° C.) air temperature for 60 sec. The resulting dried creamer and sugar co-agglomerates have a bulk density of 0.45 to 0.54 gm/cc and a moisture content of 1.9 to 2.3% (oven dried for 16 hours at 105° C.).

Market coffee infusion bags (Folgers Coffee Singles, The Procter & Gamble Company; Cincinnati, Ohio) are carefully opened at the top. The entire bag contents are dumped out and replaced with 5.5 grams of various non-dairy coffee creamers, mixtures of non-dairy creamers and fine grade sugar, or agglomerated creamer and sugar base. The bags are sealed and brewed in 6 oz cups for 60 seconds, dunked up and down for 15 seconds, and finally allowed to drain for 15 seconds. The infusion concentration is measured by refractive index at 30° C. The average results of duplicate experiments are shown in the following table:

| PRODUCT | Extracton Temperature (°C.) | INFUSION SOLIDS (%) | EXTRACTION YIELD (%) |
|---|---|---|---|
| 100% Coffee Mate ™ | 71 | 2.2 | 67.9 |
| 51% Coffee Mate ™ + 49% fine grade sugar | 64–71 | 1.72 | 53.1 |
| 51% commercial non-dairy creamer + 49% fine grade sugar | 63–67 | 1.81 | 55.8 |
| co-agglomerated non-dairy creamer/sugar base | 61–62 | 3.15 | 98.5 |
| finely ground co-agglomerated non-dairy creamer/sugar base | 67–69 | 1.77 | 54.6 |

Surprisingly, the co-agglomerated non-dairy creamer and sugar base shows superior extraction performance compared to either the non-agglomerated starting material or commercial creamer products. The criticality of maintaining the porous agglomerate structure is also demonstrated by comparing the finely ground co-agglomerated creamer and sugar to the non-ground co-agglomerated creamer and sugar. Without being bound by theory, it is believed that the structure produced by steam agglomeration wets very fast, and thus promotes both rapid and complete extraction of the hydrophobic creamer from the infusion bag.

EXAMPLE 2

A single serving infusion product of the present invention is made and subsequently used to make a beverage. The infusion product is compared to a slurry brew of identical ingredients.

Commercial grade infusion bag paper, Crompton Super Seal 81703 (J. R. Crompton Ltd, Marietta, Ga.) having 21 gm/m$^2$ basis weight is made into single chamber bags. The approximate dimension of the infusion bags are 3 in. high by 2⅜ in. wide. The bags are filled with 3.71 gm dark roasted ground coffee, 1.24 gm spray dried soluble coffee, 5.7 gm agglomerated creamer and sugar base prepared as in Example 1, 1.8 gm of fine grade sugar, and 0.55 gm of vanilla flavorings. The bags are sealed and brewed in 6 oz. cups for 60 sec., dunked up and down for 15 sec., and finally allowed to drain for 15 sec. The infusion concentration is measured by refractive index at 30° C. Duplicate infusion experiments are compared to a 5 min. agitated slurry brew of identical ingredients without the use of an infusion bag. The average results are shown in the following table.

| PRODUCT | Extraction Temperature (°C.) | INFUSION SOLIDS (%) | EXTRACTION YIELD (%) |
|---|---|---|---|
| infusion bag | 82 | 5.22 | 93 |
| slurry brew | 82 | 5.59 | 100 |

Virtually complete extraction is obtained by the infusion bag. Following extraction, the bag is virtually free of residual sugar or creamer solids. The finished beverage was evaluated by trained sensory panelists and judged to be of excellent quality.

EXAMPLE 3

The co-agglomeration of the creamer base and sweetener base of the infusion product is compared to a product wherein only the creamer is agglomerated.

A co-agglomerate creamer (35% fat content) and sugar base (51% and 49% weight ratio, respectively), is prepared using conditions similar to those of Example 1. The co-agglomerate is set for 70 seconds prior to drying at 165° F. (about 74° C.) in a Jeffrey dryer. The bulk density of the creamer/sugar co-agglomerate is 0.37 gm/cc. The moisture content is 2.2%. Typical size distribution for the creamer/sugar co-agglomerate is 5–11% on 12 mesh, 59–67% on 30 mesh, 14–15% on 45 mesh, 6–7% on 60 mesh, 3–5% on 100 mesh, and 4–6% on Pan.

Commercial non-dairy creamer is steam agglomerated using the same process conditions used for the creamer/sugar co-agglomerate. The bulk density of the agglomerated creamer is 0.4 gm/cc. The moisture content is 4.4%.

Commercial grade infusion bag paper, Crompton Super Seal 81703 (J. R. Crompton Ltd, Marietta, Ga.), having 21 gm/m$^2$ basis weight is made into single chamber bags. The approximate dimensions of the infusion bags are 3 in. high by 2⅜ in. wide. The bags are filled with 13 gm of material. This consists of 5.5 gm dark roasted ground coffee and 7.5 gm of various non-dairy creamer and sugar mixes, creamer/sugar co-agglomerate, or sugar and agglomerated creamer. The bags are sealed and brewed in 6 oz cups for 60 sec., dunked up and down for 15 sec., and finally allowed to drain for 15 sec. The infusion concentration is measured by refractive index at 30° C. The average results of six replicate experiments are shown in the following table.

| PRODUCT | Extraction Temperature (°C.) | INFUSION WEIGHT (gm) | INFUSION SOLIDS (%) | EXTRACTION YIELD (%) |
|---|---|---|---|---|
| 51% non-dairy creamer + 49% fine grade sugar | 78–82 | 159.7 | 2 | 24.9 +/− 0.25 |
| 51% agglomerated non-dairy creamer + 49% fine grade sugar | 77–82 | 158.8 | 2.12 | 26.2 +/− 0.11 |
| 51% Coffee Mate ™ + 49% fine grade sugar | 78–82 | 162.5 | 2.5 | 31.1 +/− 0.17 |
| non-dairy creamer/sugar | 78–82 | 152 | 4.44 | 53.2 +/− |

| PRODUCT | Extraction Temperature (°C.) | INFUSION WEIGHT (gm) | INFUSION SOLIDS (%) | EXTRACTION YIELD (%) |
|---|---|---|---|---|
| co-agglomerate (51/49 weight ratio) | | | | 0.01 |
| crushed non-dairy creamer/sugar co-agglomerate (51/49 weight ratio) | 78–82 | 157.3 | 2.97 | 35.9 +/− 0.09 |

The results demonstrate that co-agglomeration of the creamer base to the sugar base is surprisingly critical for maximum extraction yield. The co-agglomerated non-dairy creamer and sugar demonstrate improved extraction performance at the 99.9% confidence level (student T test) compared to the blend of non-dairy creamer and sugar.

The results further demonstrate that such co-agglomeration reduces the variability of the infusion composition and yield. This is seen in the lower variance observed in the extraction yield of the infusion product of the present invention.

The results further demonstrate that agglomeration of the creamer alone does not result in an appreciable improvement in extraction performance. The presence of sugar in the creamer/sweetener co-agglomerate promotes rapid wetting and dissolution of the hydrophilic non-dairy creamer.

In addition, the commercial instant non-dairy creamers do not yield the same level of extraction performance as the creamer/sweetener co-agglomerate. Typically, such commercial instant non-dairy creamers are made by water wetting the creamer followed by drying. The resultant product has a higher density and less porous structure.

Lastly, maintaining the porosity of the creamer/sweetener co-agglomerate is critical for obtaining optimal extraction performance. This is readily demonstrated by comparing the finely ground creamer/sweetener co-agglomerate with the non-finely ground creamer/sweetener co-agglomerate. Preferably, the bulk density of the creamer/sweetener co-agglomerate is about 0.5 gm/cc or less, for optimum extraction performance.

EXAMPLE 4

A multiple serving infusion products of the present invention are compared to multiple serving products wherein the creamer and sweetener bases are not co-agglomerated.

Commercial grade infusion bag paper, Crompton Super Seal 81703 (J. R. Crompton Ltd, Marietta, Ga.), having 21 gm/m² basis weight is made into single chamber filter packs. The approximate dimensions of the infusion bags are 5 in. high by 4½ in. wide. Bags for preparing 2 and 4 cups of beverage are formulated. The 2 cup bag is filled with 10 gm dark roasted ground coffee and 40 gm of either creamer/sugar co-agglomerate (prepared as in Example 1), or a mixture of creamer and sugar. The creamer/sugar co-agglomerate has a bulk density of 0.35 gm/cc and moisture content of 1.5%.

The bags are sealed and brewed in a Norelco™ automatic drip coffee maker. The bag is extracted with 160° F. (about 71° C.) water. The infusion concentration is measured by refractive index at 30° C. Duplicate experiments are shown in the following table.

| PRODUCT | Extraction Temperature (°C.) | INFUSION WEIGHT (gm) | INFUSION SOLIDS (%) | EXTRACTION YIELD (%) |
|---|---|---|---|---|
| 2 cup product - co-agglomerated creamer/sugar | 72 | 338.4 | 9.19 | 62.1 |
| 2 cup product - creamer + sugar mixture | 71 | 334.9 | 6.36 | 42.7 |
| 4 cup product - co-agglomerated creamer/sugar | 72 | 692.4 | 8.75 | 60.5 |
| 4 cup product - creamer + sugar mixture | 71 | 686.9 | 6.75 | 46.4 |

The infusion bags containing the creamer/sweetener co-agglomerate demonstrate virtually complete extraction. Slurry brews for 5 minutes of the bag ingredients yielded 70.8% extraction yields. The extracted bags are free of residual sugar or creamer solids. The bags containing creamer and sugar mixtures do not extract uniformly and leave a large residue of un-extracted materials in the bag. The finished beverage is evaluated by trained sensory panelists and judged to have an excellent sweet and creamy coffee flavor.

EXAMPLE 5

A foaming cappuccino infusion product of the present invention, and beverage derived therefrom, is made as follows.

43.6% fine grade sugar, 8.8% lactose, 27.1% commercial grade non-dairy creamer, 17.6% commercial grade foaming creamer and 2.9% carrageenan gum are blended in a ribbon blender. These mixtures are agglomerated as described in Example 1. Typical bulk density is 0.35–0.4 gm/cc. The creamer and sugar co-agglomerates are free flowing and non-hydroscopic.

10 gm dark roast expresso grind is blended with 40 gm of the agglomerated creamer and sugar base. A filter pack, having the same dimensions as the filter pack described in Example 4, is filled with the blend. The infusion product is brewed in an automatic drip-type coffee maker to yield a beverage having a high foamed head, thick creamy texture, and delectable coffee flavor.

EXAMPLE 6

A flavored reduced calorie infusion product, and beverage therefrom, of the present invention is prepared.

40% low fat milk solids, 55.7% maltodextrin (10 Dextrose Equivalent), 0.3% Aspartame™, 2% carrageenan gum, and 2% cellulose gel (Avicel™) are blended in a ribbon blender. This mixture is agglomerated as described in Example 1. Typical bulk density is 0.35–0.4 gm/cc. The creamer and sweetener co-agglomerates are free flowing, non-hydroscopic, with a good sweetness and thick creamy flavor profile.

5 gm of roast and ground coffee, 8 gm of the above non-fat milk/artificial sweetener/gum co-agglomerate, and 0.2 gm Irish Creme flavoring is blended together. This blend is placed into an infusion bag of the type described in Example 2. The bag is brewed in 77° C. water for 60 sec. to yield a flavorful reduced calorie coffee beverage.

EXAMPLE 7

A tea-based single serving infusion product, and beverage therefrom, of the present invention is prepared.

3 gm of commercial grade English Breakfast (Thomas Lipton, Inc., Englewood Cliffs, N.J.) tea blend, 5 gm creamer/sugar co-agglomerate (prepared as in Example 1), and 0.55 gm herbal flavorings are filled into a single chamber infusion bag. Brewing of the infusion bag in 77° C. water for 60 sec. yields a flavorful, sweet and creamy herbal tea beverage.

All publications and patent applications mentioned hereinabove are hereby incorporated in their entirety by reference.

It is understood that the examples and embodiments described herein are for illustrative purposes only and that various modifications or changes in light thereof will be suggested to one skilled in the art and are to be included in the spirit and purview of this application and scope of the appended claims.

What is claimed is:

1. An infusion package for making a beverage comprising an infusible dry beverage making substance containing water soluble extractable solids and a water soluble additive material, both packaged in a water permeable infusion bag, wherein the soluble additive material comprises a dry steam agglomerated co-agglomerate of a particulate, dairy or non-dairy creamer and a particulate, natural or artificial sweetener wherein the co-agglomerate has a bulk density in the range from about 0.3 g/cc to about 0.7 g/cc.

2. A method of preparing a beverage comprising contacting the infusion package of claim 1 with hot water for a time sufficient to form said beverage.

3. The infusion package of claim 1, wherein said infusible substance comprises coffee or tea.

4. The infusion package of claim 3, wherein said sweetener comprises a natural sweetener.

5. The infusion package of claim 3, wherein said sweetener comprises an artificial sweetener.

6. The infusion package of claim 3, wherein said soluble additive material further comprises a thickening agent.

7. The infusion package of claim 3, wherein said infusible substance comprises ground coffee.

8. A method of preparing a beverage comprising contacting the infusion package of claim 7 with hot water for a time sufficient to form said beverage.

9. The infusion package of claim 7, wherein said sweetener comprises a natural sweetener.

10. The infusion package of claim 9, wherein said sweetener comprises an artificial sweetener.

11. A method of preparing a beverage comprising contacting the infusion package of claim 9 with hot water for a time sufficient to form said beverage.

12. The infusion package of claim 3, wherein said soluble additive material further comprises soluble coffee.

13. The infusion package of claim 12, wherein said soluble additive material further comprises a thickening agent.

14. A process for preparing an infusion package useful for making a beverage, said process comprising:

a) steam agglomerating a particulate, dairy or non-dairy creamer and a particulate, natural or artificial sweetener to form a co-agglomerate of the creamer and the sweetener having a bulk density ranging from about 0.3 g/cc to about 0.7 g/cc, b) mixing the co-agglomerate of step a) with an infusible dry beverage making substance containing-water soluble extractable solids, and c) packaging the mixture of step b) in a water permeable infusion bag.

15. The process of claim 14, wherein said infusible substance is coffee or tea.

16. The process of claim 15, wherein said sweetener comprises a natural sweetener.

17. The process of claim 15, wherein said sweetener comprises an artificial sweetener.

* * * * *